United States Patent
Nevill et al.

(10) Patent No.: US 7,000,094 B2
(45) Date of Patent: Feb. 14, 2006

(54) STORING STACK OPERANDS IN REGISTERS

(75) Inventors: Edward Colles Nevill, Huntingdon (GB); Andrew Christopher Rose, Cambridge (GB)

(73) Assignee: ARM Limited, Cambridge (GB)

( * ) Notice: Subject to any disclaimer, the term of this patent is extended or adjusted under 35 U.S.C. 154(b) by 670 days.

(21) Appl. No.: 09/887,560

(22) Filed: Jun. 25, 2001

(65) Prior Publication Data

US 2002/0066004 A1    May 30, 2002

(30) Foreign Application Priority Data

Oct. 5, 2000    (GB) ................... 0024404

(51) Int. Cl.
*G06F 9/30* (2006.01)

(52) U.S. Cl. ...................................... 712/209

(58) Field of Classification Search ............... 712/209, 712/227
See application file for complete search history.

(56) References Cited

U.S. PATENT DOCUMENTS

| | | | |
|---|---|---|---|
| 3,889,243 A | 6/1975 | Drimak |
| 4,236,204 A | 11/1980 | Groves |
| 4,587,632 A | 5/1986 | Ditzel |
| 4,922,414 A | 5/1990 | Holloway et al. |
| 4,969,091 A | 11/1990 | Muller |
| 5,136,696 A | 8/1992 | Beckwith et al. |
| 5,455,775 A | 10/1995 | Huber et al. |
| 5,619,665 A | 4/1997 | Emma |
| 5,638,525 A | 6/1997 | Hammond et al. |
| 5,659,703 A | 8/1997 | Moore et al. |
| 5,740,461 A | 4/1998 | Jaggar |
| 5,742,802 A | 4/1998 | Harter et al. |
| 5,752,035 A | 5/1998 | Trimberger |
| 5,784,584 A | 7/1998 | Moore et al. |
| 5,790,825 A | 8/1998 | Traut |
| 5,809,336 A | 9/1998 | Moore et al. |
| 5,838,948 A | 11/1998 | Bunza |
| 5,875,336 A | 2/1999 | Dickol et al. |
| 5,892,966 A | 4/1999 | Petrick et al. |
| 5,898,850 A | 4/1999 | Dickol et al. |
| 5,898,885 A | 4/1999 | Dickol et al. |
| 5,925,123 A | 7/1999 | Tremblay et al. |
| 5,926,832 A | 7/1999 | Wing et al. |

(Continued)

FOREIGN PATENT DOCUMENTS

WO    WO 00/34844    6/2000

OTHER PUBLICATIONS

H. Stone, Chapter 12—"A Pipeline Push-Down Stack Computer", 1969, pp. 235-249.

(Continued)

*Primary Examiner*—Eddie Chan
*Assistant Examiner*—Aimee Li
(74) *Attorney, Agent, or Firm*—Nixon & Vanderhye P.C.

(57) ABSTRACT

A data processing apparatus includes a processor core having a bank of registers. The bank of registers include a set of registers that are used for the storage of stack operands. Instructions from a second instruction set specifying stack operands are translated by an instruction translator into instructions of a first instruction set (or control signals corresponding to those instructions) specifying register operands. These translated instructions are then executed by the processor core. The instruction translator has multiple mapping states for controlling which registers corresponding to which stack operands within the stack. Changes between mapping states are carried out in dependence of stack operands being added to or removed from the set of registers.

15 Claims, 8 Drawing Sheets

U.S. PATENT DOCUMENTS

| | | | |
|---|---|---|---|
| 5,937,193 A | 8/1999 | Evoy | |
| 5,953,520 A | 9/1999 | Mallick | |
| 5,953,741 A | 9/1999 | Evoy et al. | |
| 6,003,126 A | 12/1999 | Huynh et al. | |
| 6,009,499 A | 12/1999 | Koppala | |
| 6,009,509 A | 12/1999 | Leung et al. | |
| 6,014,723 A | 1/2000 | Tremblay et al. | |
| 6,021,469 A | 2/2000 | Tremblay et al. | |
| 6,026,485 A | 2/2000 | O'Connor et al. | |
| 6,031,992 A | 2/2000 | Cmelik et al. | |
| 6,038,643 A | 3/2000 | Tremblay et al. | |
| 6,070,173 A | 5/2000 | Huber et al. | |
| 6,088,786 A | 7/2000 | Feierbach et al. | |
| 6,122,638 A | 9/2000 | Huber et al. | |
| 6,125,439 A | 9/2000 | Tremblay et al. | |
| 6,148,391 A | 11/2000 | Petrick | |
| 6,298,434 B1 | 10/2001 | Lindwer | |
| 6,317,872 B1 | 11/2001 | Gee et al. | |
| 6,332,215 B1 * | 12/2001 | Patel et al. | 717/141 |
| 6,338,134 B1 | 1/2002 | Leung et al. | |
| 6,349,377 B1 | 2/2002 | Lindwer | |
| 6,374,286 B1 | 4/2002 | Gee et al. | |
| 6,606,743 B1 | 8/2003 | Raz et al. | |

OTHER PUBLICATIONS

C. Glossner et al, "Delft-Java Link Translation Buffer", Aug. 1998.

N. Vijaykrishnan et al, "Object-Oriented Architectural Support For a Java Processor" 1998, pp. 330-355.

C. Glossner et al, "The Delft-Java Engine: An Introduction", Aug. 1997.

K. Ebcioglu et al, "A Java ILP Machine Based On Fast Dynamic Compilation", Jan. 1997, pp. 1-13.

A. Wolfe, "First Java-specific chip takes wing"*EETimes*—1997.

Y. Patt, *Introduction to Computer Systems From Bits and Gates to C and Beyond*, 1999, pp. 1-517.

M. Ertl, "Stack Caching for Interpreters" 1994, pp. 1-13.

M. Ertl, "Stack Caching for Interpreters" 1995, pp. 1-13.

M. Ertl, "Implementation of Stack-Based Languages on Register Machines" Apr. 1996, pp. 1-4.

J. O'Connor et al, "PicoJava-I: The Java Virtual Machine in Hardware" *IEEE Micro* A Case for Intelligent RAM, Mar./Apr. 1997, pp. 45-53.

K. Andrews et al, "Migrating a CISC Computer Family Onto RISC Via Object Code Translation" 1992, pp. 213-222.

"PicoJava I Microprocessor Core Architecture" Oct. 1996, pp. 1-8, Sun Microsystems.

M. Ertl, "A New Approach to Forth Native Code Generation" 1992.

M. Maierhofer et al, "Optimizing Stack Code" 1997, p. 19.

D. Ungar et al, "Architecture of SOAR: Smalltalk on a RISC" The 11th Annual International Symposium on Computer Architecture, Jun. 1984, pp. 188-197.

O. Steinbusch, "Designing Hardware to Interpret Virtual Machine Instructions" Feb. 1998, pp. 1-59.

R. Kapoor et al, "Stack Renaming of the Java Virtual Machine" Dec. 1996. pp. 1-17.

A. Yonezawa et al, "Implementing Concurrent Object-Oriented Languages in Multicomputers" *Parallel and Distributed Technology (Systems and Applications )* May 1993, pp. 49-61.

C. Hsieh et al, "Java Bytecode to Native Code Translation; The Caffeine Prototype and Preliminary Results" IEEE/ACM International Symposium on Microarchitecture, Dec. 1996, pp. 90-97.

Y. Patt et al, *Introduction to Computer Systems From Bits and Gates to C and Beyond*, 2001, pp. 1-526.

Sun Microsystems PicoJava Processor Core Data Sheet, Dec. 1997, pp. 1-11.

H. McGhan et al, PicoJava A Direct Execution Engine for Java Bytecode, Oct. 1998, pp. 22-26.

C. Glossner et al, "Parallel Processing" Euro-Par 1997: Passau, Germany, Aug. 1997.

Y. Patt, *Introduction to Computer Systems From Bits and Gates to C and Beyond*, 1999, pp. 10-12 & 79-82.

Espresso—The High Performance Java Core Specification, Oct. 2001, pp. 1-33, Aurora VLSI, Inc.

J. Gosling, "Java Intermediate Bytecodes" 1995, pp. 111-118.

P. Koopman, Jr. "Stack Computers The New Wave" 1989, pp. 1-234.

M. Mrva et al, "A Scalable Architecture for Multi-Threaded JAVA Applications" Design Automation and Test in Europe, Feb. 1998, pp. 868-874.

L. Chang et al, "Stack Operations Folding in Java Processors" *IEEE Proc.—Comput. Digit. Tech.*, vol. 145, No. 5, pp. 333-340 Sep. 1998.

L. Ton et al, Proceedings of the '97 International Conference on Parallel and Distributed Systems, "Instruction Folding in Java Processor", pp. 138-143, Dec. 1997.

K. Buchenrieder et al, "Scalable Processor Architecture for Java With Explicit Thread Support" *Electronics Letters* vol. 33, No. 18, pp. 1532+, Aug. 1997.

C. Chung et al, Proceedings of the '98 International Conference on Parallel and Distributed Systems, "A Dual Threaded Java Processor for Java Multithreading" pp. 693-700, Dec. 1998.

I. Kazi et al, "Techniques for Obtaining High Performance in Java Programs" Sep. 2000, pp. 213-240.

R. Kieburtz, "A RISC Architecture for Symbolic Computation" 1987, pp. 146-155.

M. Berekovic et al, "Hardware Realization of a Java Virtual Machine for High Performance Multimedia Applications" *Signal Processing Systems SIPS 98*, pp. 479-488, 1997.

P. Deutsch, "Efficient Implementation of the Smalltalk-80 System" 1983, pp. 297-302.

"Rockwell Produces Java Chip" Sep. 1997, CNET news.com.

Y. Patt et al, *Introduction to Computing Systems from Bits and Gates to C and Beyond*, 2001, pp. 1-16, 91-118 & 195-209.

* cited by examiner

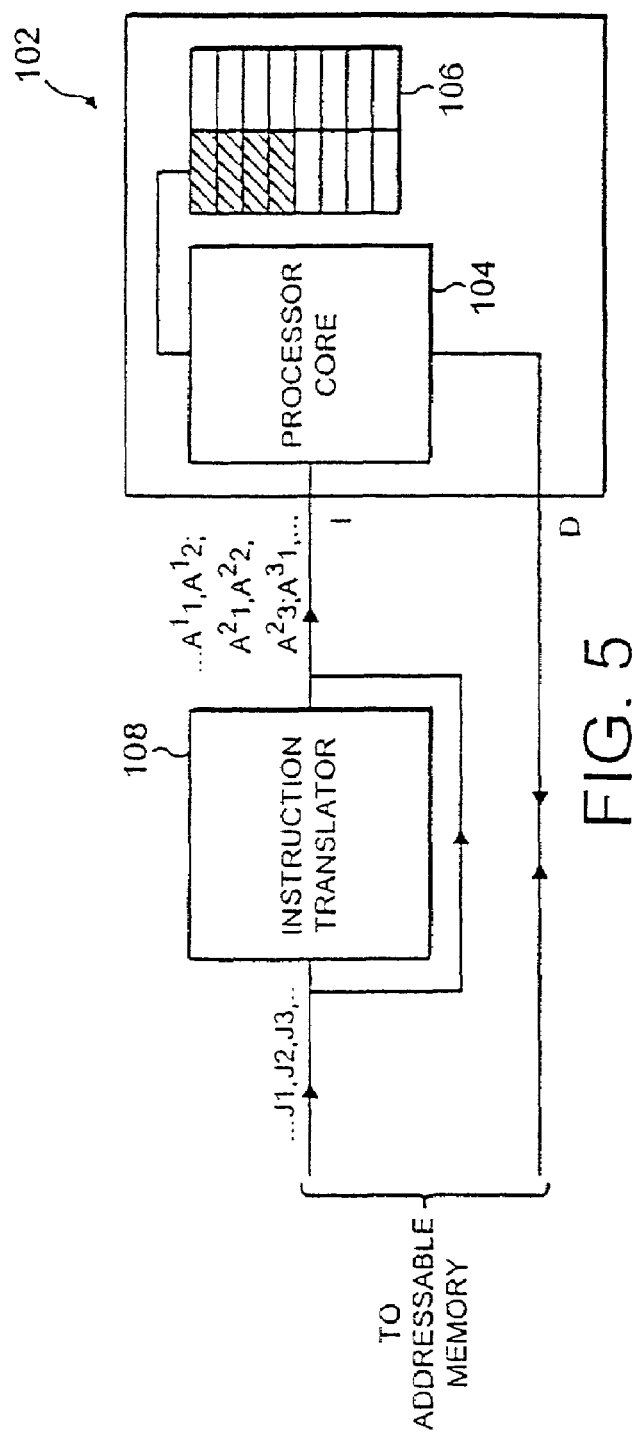

| JAVA INSTRUCTION | iadd (RF=2,RF>0) | iadd (RF=2,RF>1) | iadd (SA=-1) |
|---|---|---|---|
| ARM INSTRUCTION(S) | LDR R0,[RStack,#-4]! (POP) | LDR R3,[RStack,#-4]! (POP) | ADD R3, R3, R0 |
| STATE | 00000 | 00100 | 01000 | 00111 |
| R0 | E | SOA TOS | SOA TOS | E |
| R1 | E | E | E | E |
| R2 | E | E | E | E |
| R3 | E | E | SOB TOS-1 | (SOA+SOB) TOS |

| JAVA INSTRUCTION | lload¹ (RF=0,RE>2) | lload² (RF=0,RE>2) | lload² (RF=0,RE=2) | |
|---|---|---|---|---|
| ARM INSTRUCTIONS | LDR R1,[Rvars,#4] LDR R0,[Rvars,#0] | STR R3,[RStack],#-4 (PUSH) | LDR R3,[Rvars,#4] LDR R2,[Rvars,#0] | |
| STATE | 00000 | 00100 | 01000 | 10011 |
| R0 | E | SOC TOS-1 | SOC TOS-1 | SOC TOS-3 |
| R1 | E | SOD TOS | SOD TOS | SOD TOS-2 |
| R2 | E | E | E | SOE TOS-1 |
| R3 | (SOA+SOB) TOS | (SOA+SOB) TOS | E | SOF TOS |

FIG. 6

STORING STACK OPERANDS IN REGISTERS

BACKGROUND OF THE INVENTION

1. Field of the Invention

This invention relates to the field of data processing systems. More particularly, this invention relates to data processing systems having a processor core with a register bank executing instructions of a first instruction set being used in conjunction with an instruction translator operable to translate instructions of a second instruction set into instructions of the first instruction set.

2. Description of the Prior Art

It is known to provide data processing systems supporting multiple instruction sets. An example of such systems are the Thumb enabled processors produced by ARM Limited of Cambridge, England that may execute both 16-bit Thumb instructions and 32-bit ARM instructions. Both the Thumb instructions and the ARM instructions execute operations (such as mathematical manipulations, loads, stores etc) upon operands stored within registers of the processor core specified by register fields within the instructions. Considerable effort is expended in developing compilers that are able to efficiently use the register resources of the processor core to produce instruction streams that execute rapidly.

Another class of instruction sets are those that use a stack approach to storing and manipulating the operands upon which they act. The stack within such a system may store a sequence of operand values which are placed into the stack in a particular order and then removed from the stack in the reverse of that order. Thus, the last operand to be placed into the stack will also typically be the first operand to be removed from the stack. Stack based processors may provide a block of storage elements to which stack operands may be written and from which stack operands may be read in conjunction with a stack pointer which indicates the current "top" position within the stack. The stack pointer specifies a reference point within the stack memory which is the latest stack operand to be stored into the stack and from which other accesses to the stack may be referenced. Considerable effort is also expended in producing compilers that are able to efficiently utilise the stack hardware resources within such stack based processor systems.

A specific example of a stack based instruction set is the Java Virtual Machine instruction set as specified by Sun Microsystems Inc. The Java programming language seeks to provide an environment in which computer software written in Java can be executed upon many different processing hardware platforms without having to alter the Java software.

It is a constant aim within data processing systems that they should be able to execute the computer software controlling them as rapidly as possible. Measures that can increase the speed with which computer software may be executed are strongly desirable.

Examples of known systems for translation between instruction sets and other background information may be found in the following: U.S. Pat. No. 5,805,895; U.S. Pat. No. 3,955,180; U.S. Pat. No. 5,970,242; U.S. Pat. No. 5,619,665; U.S. Pat. No. 5,826,089; U.S. Pat. No. 5,925,123; U.S. Pat. No. 5875,336; U.S. Pat. No. 5,937,193; U.S. Pat. No. 5,953,520; U.S. Pat. No. 6,021,469; U.S. Pat. No. 5,568,646; U.S. Pat. No. 5,758,115; U.S. Pat. No. 5,367,685; IBM Technical Disclosure Bulletin, March 1988, pp308–309, "System/370 Emulator Assist Processor For a Reduced Instruction Set Computer"; IBM Technical Disclosure Bulletin, July 1986, pp548–549, "Full Function Series/1 Instruction Set Emulator"; IBM Technical Disclosure Bulletin, March 1994, pp605–606, "Real-Time CISC Architecture HW Emulator On A RISC Processor"; IBM Technical Disclosure Bulletin, March 1998, p272, "Performance Improvement Using An EMULATION Control Block"; IBM Technical Disclosure Bulletin, January 1995, pp537–540, "Fast Instruction Decode For Code Emulation on Reduced Instruction Set Computer/Cycles Systems"; IBM Technical Disclosure Bulletin, February 1993, pp231–234, "High Performance Dual Architecture Processor"; IBM Technical Disclosure Bulletin, August 1989, pp40–43, "System/370 I/O Channel Program Channel Command Word Prefetch"; IBM Technical Disclosure Bulletin, June 1985, pp305–306, "Fully Microcode-Controlled Emulation Architecture"; IBM Technical Disclosure Bulletin, March 1972, pp3074–3076, "Op Code and Status Handling For Emulation"; IBM Technical Disclosure Bulletin, August 1982, pp954–956, "On-Chip Microcoding of a Microprocessor With Most Frequently Used Instructions of Large System and Primitives Suitable for Coding Remaining Instructions"; IBM Technical Disclosure Bulletin, April 1983, pp5576–5577, "Emulation Instruction"; the book ARM System Architecture by S Furber; the book Computer Architecture: A Quantitative Approach by Hennessy and Patterson; and the book The Java Virtual Machine Specification by Tim Lindholm and Frank Yellin $1^{st}$ and $2^{nd}$ Editions.

SUMMARY OF THE INVENTION

Viewed from one aspect the present invention provides apparatus for processing data, said apparatus comprising:

(i) a processor core having a register bank containing a plurality of registers and being operable to execute operations upon register operands held in said registers as specified within instructions of a first instruction set; and (ii) an instruction translator operable to translate instructions of a second instruction set into translator output signals corresponding to instructions of said first instruction set, instructions of said second instruction set specifying operations to be executed upon stack operands held in a stack; wherein (iii) said instruction translator is operable to allocate a set of registers within said register bank to hold stack operands from a portion of said stack;

(iv) said instruction translator has a plurality of mapping states in which different registers within said set of registers hold respective stack operands from different positions within said portion of said stack; and (v) said instruction translator is operable to change between mapping states in dependence upon operations that add or remove stack operands held within said set of registers.

The invention provides for the execution of instructions of a second, stack based instruction set by translating these to instructions of a first, register based instruction set for execution upon a processor core. The invention provides a set of registers within the register bank to hold stack operands from a portion of the stack. This effectively caches stack operands within the processor core to speed execution. Furthermore, in order to more efficiently use the registers allocated to stack operands, the instruction translator has a plurality of different mapping states in which different registers hold respective stack operands from different positions within the portion of the stack cached. The mapping state is changed in dependence upon operations that add or remove stack operands held within the set of registers used for the stack in a manner that provides a function similar to that of a stack pointer within a stack. This approach reduces the processing overhead required to provide stack-like storage within the registers of a register based processor.

In preferred embodiments of the invention said instruction translator provides mapping states such that stack operands are added to or removed from said set of registers without moving stack operands between registers within said set of registers.

This preferred feature is such that the mapping states are used to avoid the need to move any stack operands between registers once they have been stored into those registers thereby avoiding a significant processing overhead that would otherwise be incurred in seeking to provide a system in which stack operands having a particular position within the stack were always found in predetermined registers.

Whilst it will be appreciated that the set of registers could hold stack operands from any position within the stack, it is strongly desirable that the set of registers store a top portion of the stack including a top of stack operand. Stack based processing systems most often access stack operands that were only recently stored to the stack and accordingly keeping these stack operands within the registers where they may be rapidly accessed is strongly advantageous. Furthermore, having the top of stack operand held within the registers makes the ability of the instruction translator to move between different mapping states highly advantageous as the top of stack operand will often change as stack operands are pushed to the stack or popped from the stack.

Whilst it is possible that the portion of the stack not held within the registers could be provided with various different hardware arrangements, in preferred embodiments of the invention the stack includes a plurality of addressable memory locations holding stack operands.

An addressable memory is frequently found within processing systems together with mechanisms such as sophisticated cache memories for enabling high speed access to the data within such an addressable memory.

It will be appreciated that the registers of the processor core that may be devoted to the storage of stack operands is limited by the need to provide other registers for functions such as the management of the translation of instructions from the second instruction set to the first instruction set and the emulation of other control values, such as a variables pointer or a constant pool pointer, that may be found in a stack based processing system. In this context, stack operands that overflow from the set of registers provided for stack operand storage may be held within the addressable memory.

In a complementary manner, many high speed register based processing systems are arranged to provide data processing manipulations only upon data values held within registers in order to avoid problems that can occur due to relatively long memory access latency and the like. In this context, the invention provides that stack operands are always loaded into the set of registers prior to use.

The instruction translator may conveniently be arranged to use instruction templates for translating between the second instruction set and the first instruction set. Such instruction templates provide an advantageous degree of flexibility in the nature of the mapping that may be achieved between instructions of the second instruction set and typically several instructions of the first instruction set.

It will be appreciated that the instruction translator could take a wide variety of forms. In particular, the instruction translator could be provided as special purpose hardware for translating or compiling the second instruction set or as software controlling the processor core to perform similar translation or compilation functions. A mix of approaches may also be usefully employed. In the case of a software interpreter, the translator output signals may be translated instructions of the first instruction set produced by the software interpreter.

In particular, a hardware translator may be provided to achieve high speed translation of simple frequently occurring instructions within the second instruction set whilst software translation may be used for complex or infrequently occurring instructions of the second instruction set which are such that the hardware overhead of providing such translation would not be practical or efficient.

A particularly preferred way in which the mapping states of the instruction translator may be controlled is to provide a plurality of state bits indicating the number of stack operands held within the set of registers and a plurality of state bits indicating which register is holding the top of stack operand.

Whilst it will be appreciated that the second instruction set could take many different forms, the invention is particularly useful in embodiments in which the second instruction set is a Java Virtual Machine instruction set.

Viewed from another aspect the present invention provides a method of processing data using a processor core having a register bank containing a plurality of registers and being operable to execute operations upon register operands held in said registers as specified within instructions of a first instruction set, said method comprising the steps of:

(i) translating instructions of a second instruction set into translator output signals corresponding to instructions of said first instruction set, instructions of said second instruction set specifying operations to be executed upon stack operands held in a stack;

(ii) allocating a set of registers within said register bank to hold stack operands from a portion of said stack;

(iii) adopting one of a plurality of mapping states in which different registers within said set of registers hold respective stack operands from different positions within said portion of said stack; and (iv) changing between mapping states in dependence upon operations that add or remove stack operands held within said set of registers.

The present invention also provides a computer program product storing a computer program for controlling a general purpose computer in accordance with the above described techniques. The computer program product could take a variety of forms, such as a floppy disk, a compact disk or a computer file downloaded from a computer network.

The above, and other objects, features and advantages of this invention will be apparent from the following detailed description of illustrative embodiments which is to be read in connection with the accompanying drawings.

BRIEF DESCRIPTION OF THE DRAWINGS

FIG. 5 schematically illustrates a data processing system for executing both processor core native instructions and instructions requiring translation;

FIG. 6 schematically illustrates, for a sequence of example instructions and states the contents of the registers used for stack operand storage, the mapping states and the relationship between instructions requiring translation and native instructions;

DESCRIPTION OF THE PREFERRED EMBODIMENTS

Figure 1:
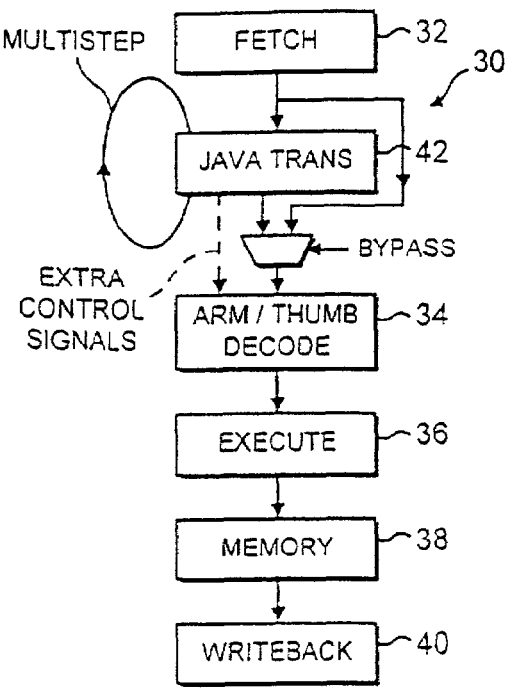
FIGS. 1 and 2 schematically represent example instruction pipeline arrangements.

FIG. 1 shows a first example instruction pipeline 30 of a type suitable for use in an ARM processor based system. The instruction pipeline 30 includes a fetch stage 32, a native instruction (ARM/Thumb instructions) decode stage 34, an execute stage 36, a memory access stage 38 and a write back stage 40. The execute stage 36, the memory access stage 38 and the write back stage 40 are substantially conventional. Downstream of the fetch stage 32, and upstream of the native instruction decode stage 34, there is provided an instruction translator stage 42. The instruction translator stage 42 is a finite state machine that translates Java bytecode instructions of a variable length into native ARM instructions. The instruction translator stage 42 is capable of multi-step operation whereby a single Java bytecode instruction may generate a sequence of ARM instructions that are fed along the remainder of the instruction pipeline 30 to perform the operation specified by the Java bytecode instruction. Simple Java bytecode instructions may required only a single ARM instruction to perform their operation, whereas more complicated Java bytecode instructions, or in circumstances where the surrounding system state so dictates, several ARM instructions may be needed to provide the operation specified by the Java bytecode instruction. This multi-step operation takes place downstream of the fetch stage 32 and accordingly power is not expended upon fetching multiple translated ARM instructions or Java bytecodes from a memory system. The Java bytecode instructions are stored within the memory system in a conventional manner such that additional constraints are not provided upon the memory system in order to support the Java bytecode translation operation.

As illustrated, the instruction translator stage 42 is provided with a bypass path. When not operating in an instruction translating mode, the instruction pipeline 30 may bypass the instruction translator stage 42 and operate in an essentially unaltered manner to provide decoding of native instructions.

In the instruction pipeline 30, the instruction translator stage 42 is illustrated as generating translator output signals that fully represent corresponding ARM instructions and are passed via a multiplexer to the native instruction decoder 34. The instruction translator 42 also generates some extra control signals that may be passed to the native instruction decoder 34. Bit space constraints within the native instruction encoding may impose limitations upon the range of operands that may be specified by native instructions. These limitations are not necessarily shared by the non-native instructions. Extra control signals are provided to pass additional instruction specifying signals derived from the non-native instructions that would not be possible to specify within native instructions stored within memory. As an example, a native instruction may only provide a relatively low number of bits for use as an immediate operand field within a native instruction, whereas the non-native instruction may allow an extended range and this can be exploited by using the extra control signals to pass the extended portion of the immediate operand to the native instruction decoder 34 outside of the translated native instruction that is also passed to the native instruction decoder 34.

Figure 2:
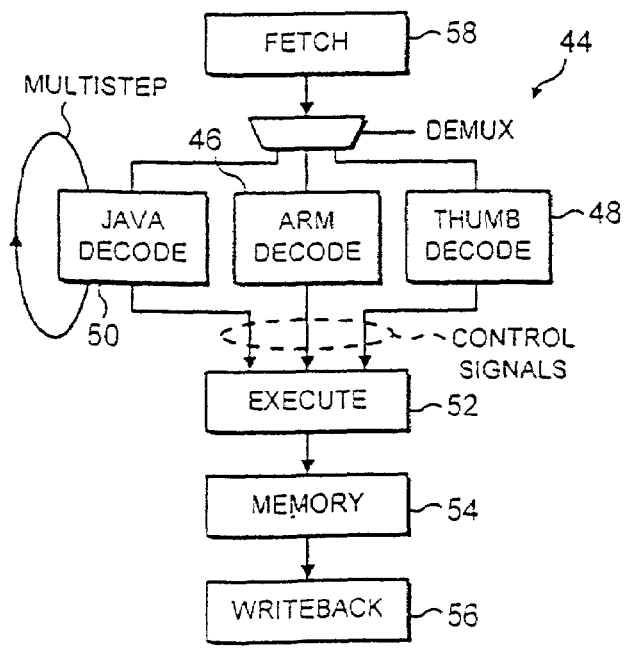

FIG. 2 illustrates a further instruction pipeline 44. In this example, the system is provided with two native instruction decoders 46, 48 as well as a non-native instruction decoder 50. The non-native instruction decoder 50 is constrained in the operations it can specify by the execute stage 52, the memory stage 54 and the write back stage 56 that are provided to support the native instructions. Accordingly, the non-native instruction decoder 50 must effectively translate the non-native instructions into native operations (which may be a single native operation or a sequence of native operations) and then supply appropriate control signals to the execute stage 52 to carry out these one or more native operations. It will be appreciated that in this example the non-native instruction decoder does not produce signals that form a native instruction, but rather provides control signals that specify native instruction (or extended native instruction) operations. The control signals generated may not match the control signals generated by the native instruction decoders 46, 48.

In operation, an instruction fetched by the fetch stage 58 is selectively supplied to one of the instruction decoders 46, 48 or 50 in dependence upon the particular processing mode using the illustrated demultiplexer.

Figure 3:
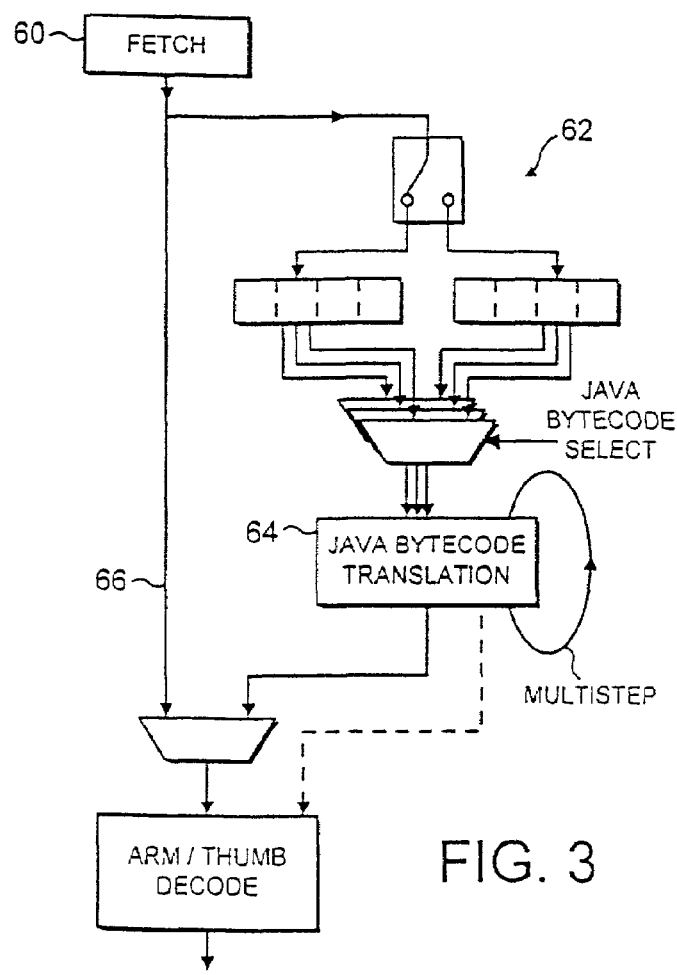
FIG. 3 illustrates in more detail a fetch stage arrangement.

FIG. 3 schematically illustrates the fetch stage of an instruction pipeline in more detail. Fetching logic 60 fetches fixed length instruction words from a memory system and supplies these to an instruction word buffer 62. The instruction word buffer 62 is a swing buffer having two sides such that it may store both a current instruction word and a next instruction word. Whenever the current instruction word has been fully decoded and decoding has progressed onto the next instruction word, then the fetch logic 60 serves to replace the previous current instruction word with the next instruction word to be fetched from memory, i.e. each side of the swing buffer will increment by two in an interleaved fashion the instruction words that they successively store.

In the example illustrated, the maximum instruction length of a Java bytecode instruction is three bytes. Accordingly, three multiplexers are provided that enable any three neighbouring bytes within either side of the word buffer 62 to be selected and supplied to the instruction translator 64. The word buffer 62 and the instruction translator 64 are also provided with a bypass path 66 for use when native instructions are being fetched and decoded.

It will be seen that each instruction word is fetched from memory once and stored within the word buffer 62. A single instruction word may have multiple Java bytecodes read from it as the instruction translator 64 performs the translation of Java bytecodes into ARM instructions. Variable length translated sequences of native instructions may be generated without requiring multiple memory system reads and without consuming memory resource or imposing other constraints upon the memory system as the instruction translation operations are confined within the instruction pipeline.

A program counter value is associated with each Java bytecode currently being translated. This program counter value is passed along the stages of the pipeline such that each stage is able, if necessary, to use the information regarding the particular Java bytecode it is processing. The program counter value for a Java bytecode that translates into a sequence of a plurality of ARM instruction operations is not incremented until the final ARM instruction operation within that sequence starts to be executed. Keeping the program counter value in a manner that continues to directly point to the instruction within the memory that is being executed advantageously simplifies other aspects of the system, such as debugging and branch target calculation.

Figure 4:
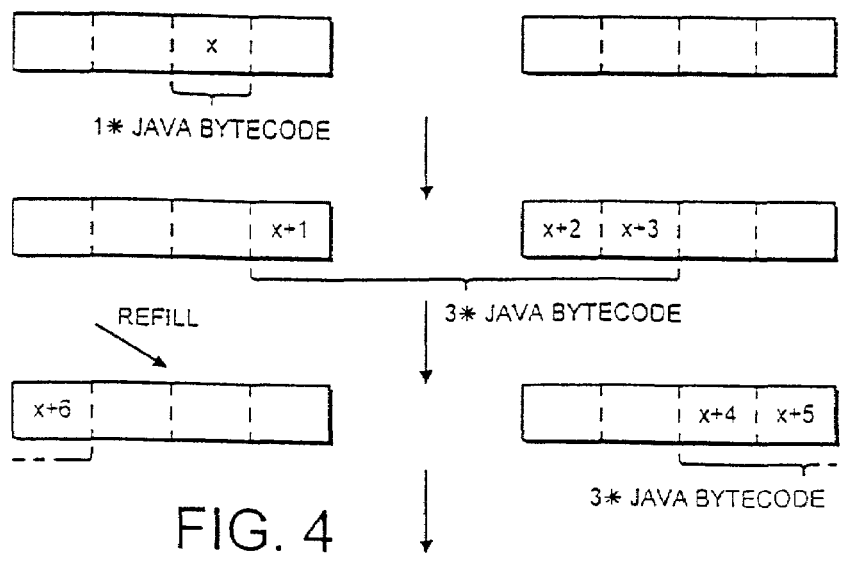
FIG. 4 schematically illustrates the reading of variable length non-native instructions from within buffered instruction words within the fetch stage.

FIG. 4 schematically illustrates the reading of variable length Java bytecode instructions from the instruction buffer 62. At the first stage a Java bytecode instruction having a length of one is read and decoded. The next stage is a Java bytecode instruction that is three bytes in length and spans between two adjacent instruction words that have been fetched from the memory. Both of these instruction words are present within the instruction buffer 62 and so instruction decoding and processing is not delayed by this spanning of a variable length instruction between instruction words fetched. Once the three Java bytecodes have been read from the instruction buffer 62, the refill of the earlier fetched of the instruction words may commence as subsequent processing will continue with decoding of Java bytecodes from the following instruction word which is already present.

The final stage illustrated in FIG. 4 illustrates a second three bytecode instruction being read. This again spans between instruction words. If the preceding instruction word has not yet completed its refill, then reading of the instruction may be delayed by a pipeline stall until the appropriate instruction word has been stored into the instruction buffer 62. In some embodiments the timings may be such that the pipeline never stalls due to this type of behaviour. It will be appreciated that the particular example is a relatively infrequent occurrence as most Java bytecodes are shorter than the examples illustrated and accordingly two successive decodes that both span between instruction words is relatively uncommon. A valid signal may be associated with each of the instruction words within the instruction buffer 62 in a manner that is able to signal whether or not the instruction word has appropriately been refilled before a Java bytecode has been read from it.

FIG. 5 shows a data processing system 102 including a processor core 104 and a register bank 106. An instruction translator 108 is provided within the instruction path to translate Java Virtual Machine instructions to native ARM instructions (or control signals corresponding thereto) that may then be supplied to the processor core 104. The instruction translator 108 may be bypassed when native ARM instructions are being fetched from the addressable memory. The addressable memory may be a memory system such as a cache memory with further off-chip RAM memory. Providing the instruction translator 108 downstream of the memory system, and particularly the cache memory, allows efficient use to be made of the storage capacity of the memory system since dense instructions that require translation may be stored within the memory system and only expanded into native instructions immediately prior to being passed to the processor core 104.

The register bank 106 in this example contains sixteen general purpose 32-bit registers, of which four are allocated for use in storing stack operands, i.e. the set of registers for storing stack operands is registers R0, R1, R2 and R3.

The set of registers may be empty, partly filled with stack operands or completely filled with stack operands. The particular register that currently holds the top of stack operand may be any of the registers within the set of registers. It will thus be appreciated that the instruction translator may be in any one of seventeen different mapping states corresponding to one state when all of the registers are empty and four groups of four states each corresponding to a respective different number of stack operands being held within the set of registers and with a different register holding the top of stack operand. Table 1 illustrates the seventeen different states of the state mapping for the instruction translator 108. It will be appreciated that with a different number of registers allocated for stack operand storage, or as a result of constraints that a particular processor core may have in the way it can manipulate data values held within registers, the mapping states can very considerably depending upon the particular implementation and Table 1 is only given as an example of one particular implementation.

TABLE 1

| STATE 00000 | | | |
| --- | --- | --- | --- |
| R0 = EMPTY | | | |
| R1 = EMPTY | | | |
| R2 = EMPTY | | | |
| R3 = EMPTY | | | |
| STATE 00100 | STATE 01000 | STATE 01100 | STATE 10000 |
| R0 = TOS | R0 = TOS | R0 = TOS | R0 = TOS |
| R1 = EMPTY | R1 = EMPTY | R1 = EMPTY | R1 = TOS-3 |
| R2 = EMPTY | R2 = EMPTY | R2 = TOS-2 | R2 = TOS-2 |
| R3 = EMPTY | R3 = TOS-1 | R3 = TOS-1 | R3 = TOS-1 |
| STATE 00101 | STATE 01001 | STATE 01101 | STATE 10001 |
| R0 = EMPTY | R0 = TOS-1 | R0 = TOS-1 | R0 = TOS-1 |
| R1 = TOS | R1 = TOS | R1 = TOS | R1 = TOS |
| R2 = EMPTY | R2 = EMPTY | R2 = EMPTY | R2 = TOS-3 |
| R3 = EMPTY | R3 = EMPTY | R3 = TOS-2 | R3 = TOS-2 |
| STATE 00110 | STATE 01010 | STATE 01110 | STATE 10010 |
| R0 = EMPTY | R0 = EMPTY | R0 = TOS-2 | R0 = TOS-2 |
| R1 = EMPTY | R1 = TOS-1 | R1 = TOS-1 | R1 = TOS-1 |
| R2 = TOS | R2 = TOS | R2 = TOS | R2 = TOS |
| R3 = EMPTY | R3 = EMPTY | R3 = EMPTY | R3 = TOS-3 |
| STATE 00111 | STATE 01011 | STATE 01111 | STATE 10011 |
| R0 = EMPTY | R0 = EMPTY | R0 = EMPTY | R0 = TOS-3 |
| R1 = EMPTY | R1 = EMPTY | R1 = TOS-2 | R1 = TOS-2 |
| R2 = EMPTY | R2 = TOS-1 | R2 = TOS-1 | R2 = TOS-1 |
| R3 = TOS | R3 = TOS | R3 = TOS | R3 = TOS |

Within Table 1 it may be observed that the first three bits of the state value indicate the number of non-empty registers within the set of registers. The final two bits of the state value indicate the register number of the register holding the top of stack operand. In this way, the state value may be readily used to control the operation of a hardware translator or a software translator to take account of the currently occupancy of the set of registers and the current position of the top of stack operand.

As illustrated in FIG. 5 a stream of Java bytecodes J1, J2, J3 is fed to the instruction translator 108 from the addressable memory system. The instruction translator 108 then outputs a stream of ARM instructions (or equivalent control signals, possibly extended) dependent upon the input Java bytecodes and the instantaneous mapping state of the instruction translator 8, as well as other variables. The example illustrated shows Java bytecode J1 being mapped to ARM instructions $A^1 1$ and $A^1 2$. Java bytecode J2 maps to ARM instructions $A^2 1$, $A^2 2$ and $A^2 3$. Finally, Java bytecode J3 maps to ARM instruction $A^3 1$. Each of the Java bytecodes may require one or more stack operands as inputs and may produce one or more stack operands as an output. Given that the processor core 104 in this example is an ARM processor core having a load/store architecture whereby only data values held within registers may be manipulated, the instruction translator 108 is arranged to generate ARM instructions that, as necessary, fetch any required stack operands into the set of registers before they are manipulated or store to addressable memory any currently held stack operands within the set of registers to make room for result stack operands that may be generated. It will be appreciated that each Java bytecode may be considered as having an associated "require full" value indicating the number of stack operands that must be present within the set of registers prior to its execution together with a "require empty" value indicating the number of empty registers within the set of registers that must be available prior to execution of the ARM instructions representing the Java opcode.

Table 2 illustrates the relationship between initial mapping state values, require full values, final state values and associated ARM instructions. The initial state values and the final state values correspond to the mapping states illustrated in Table 1. The instruction translator 108 determines a require full value associated with the particular Java bytecode (opcode) it is translating. The instruction translator (108), in dependence upon the initial mapping state that it has, determines whether or not more stack operands need to be loaded into the set of registers prior to executing the Java bytecode. Table 1 shows the initial states together with tests applied to the require full value of the Java bytecode that are together applied to determine whether a stack operand needs to be loaded into the set of registers using an associated ARM instruction (an LDR instruction) as well as the final mapping state that will be adopted after such a stack cache load operation. In practice, if more than one stack operand needs to be loaded into the set of registers prior to execution of the Java bytecode, then multiple mapping state transitions will occur, each with an associated ARM instruction loading a stack operand into one of the registers of the set of registers. In different embodiments it may be possible to load multiple stack operands in a single state transition and accordingly make mapping state changes beyond those illustrated in Table 2.

TABLE 2

| INITIAL STATE | REQUIRE FULL | FINAL STATE | ACTIONS |
|---|---|---|---|
| 00000 | >0 | 00100 | LDR R0, [Rstack, #-4]! |
| 00100 | >1 | 01000 | LDR R3, [Rstack, #-4]! |
| 01001 | >2 | 01101 | LDR R3, [Rstack, #-4]! |
| 01110 | >3 | 10010 | LDR R3, [Rstack, #-4]! |
| 01111 | >3 | 10011 | LDR R0, [Rstack, #-4]! |
| 01100 | >3 | 10000 | LDR R1, [Rstack, #-4]! |
| 01101 | >3 | 10001 | LDR R2, [Rstack, #-4]! |
| 01010 | >2 | 01110 | LDR R0, [Rstack, #-4]! |
| 01011 | >2 | 01111 | LDR R1, [Rstack, #-4]! |
| 01000 | >2 | 01100 | LDR R2, [Rstack, #-4]! |
| 00110 | >1 | 01010 | LDR R1, [Rstack, #-4]! |

TABLE 2-continued

| INITIAL STATE | REQUIRE FULL | FINAL STATE | ACTIONS |
|---|---|---|---|
| 00111 | >1 | 01011 | LDR R2, [Rstack, #-4]! |
| 00101 | >1 | 01001 | LDR R0, [Rstack, #-4]! |

As will be seen from Table 2, a new stack operand loaded into the set of registers storing stack operands will form a new top of stack operand and this will be loaded into a particular one of the registers within the set of registers depending upon the initial state.

Table 3 in a similar manner illustrates the relationship between initial state, require empty value, final state and an associated ARM instruction for emptying a register within the set of registers to move between the initial state and the final state if the require empty value of a particular Java bytecode indicates that it is necessary given the initial state before the Java bytecode is executed. The particular register values stored off to the addressable memory with an STR instruction will vary depending upon which of the registers is the current top of stack operand.

TABLE 3

| INITIAL STATE | REQUIRE EMPTY | FINAL STATE | ACTIONS |
|---|---|---|---|
| 00100 | >3 | 00000 | STR R0, [Rstack], #4 |
| 01001 | >2 | 00101 | STR R0, [Rstack], #4 |
| 01110 | >1 | 01010 | STR R0, [Rstack], #4 |
| 10011 | >0 | 01111 | STR R0, [Rstack], #4 |
| 10000 | >0 | 01100 | STR R1, [Rstack], #4 |
| 10001 | >0 | 01101 | STR R2, [Rstack], #4 |
| 10010 | >0 | 01110 | STR R3, [Rstack], #4 |
| 01111 | >1 | 01011 | STR R1, [Rstack], #4 |
| 01100 | >1 | 01000 | STR R2, [Rstack], #4 |
| 01101 | >1 | 01001 | STR R3, [Rstack], #4 |
| 01010 | >2 | 00110 | STR R1, [Rstack], #4 |
| 01011 | >2 | 00111 | STR R2, [Rstack], #4 |
| 01000 | >2 | 00100 | STR R3, [Rstack], #4 |
| 00110 | >3 | 00000 | STR R2, [Rstack], #4 |
| 00111 | >3 | 00000 | STR R3, [Rstack], #4 |
| 00101 | >3 | 00000 | STR R1, [Rstack], #4 |

It will be appreciated that in the above described example system the require full and require empty conditions are mutually exclusive, that is to say only one of the require full or require empty conditions can be true at any given time for a particular Java bytecode which the instruction translator is attempting to translate. The instruction templates used by the instruction translator 108 together with the instructions it is chosen to support with the hardware instruction translator 108 are selected such that this mutually exclusive requirement may be met. If this requirement were not in place, then the situation could arise in which a particular Java bytecode required a number of input stack operands to be present within the set of registers that would not allow sufficient empty registers to be available after execution of the instruction representing the Java bytecode to allow the results of the execution to be held within the registers as required.

It will be appreciated that a given Java bytecode will have an overall nett stack action representing the balance between the number of stack operands consumed and the number of stack operands generated upon execution of that Java bytecode. Since the number of stack operands consumed is a requirement prior to execution and the number of stack operands generated is a requirement after execution, the require full and require empty values associated with each Java bytecode must be satisfied prior to execution of that bytecode even if the nett overall action would in itself be met. Table 4 illustrates the relationship between an initial state, an overall stack action, a final state and a change in register use and relative position of the top of stack operand (TOS). It may be that one or more of the state transitions illustrated in Table 2 or Table 3 need to be carried out prior to carrying out the state transitions illustrated in Table 4 in order to establish the preconditions for a given Java bytecode depending on the require full and require empty values of the Java bytecode.

TABLE 4

| INITIAL STATE | STACK ACTION | FINAL STATE | ACTIONS |
|---|---|---|---|
| 00000 | +1 | 00101 | R1 <- TOS |
| 00000 | +2 | 01010 | R1 <- TOS-1, R2 <- TOS |
| 00000 | +3 | 01111 | R1 <- TOS-2, R2 <- TOS-1, R3 <- TOS |
| 00000 | +4 | 10000 | R0 <- TOS, R1 <- TOS-3, R2 <- TOS-2, R3 <- TOS-1 |
| 00100 | +1 | 01001 | R1 <- TOS |
| 00100 | +2 | 01110 | R1 <- TOS-1, R2 <- TOS |
| 00100 | +3 | 10011 | R1 <- TOS-2, R2 <- TOS-1, R3 <- TOS |
| 00100 | -1 | 00000 | R0 <- EMPTY |
| 01001 | +1 | 01110 | R2 <- TOS |
| 01001 | +2 | 10011 | R2 <- TOS-1, R3 <- TOS |
| 01001 | -1 | 00100 | R1 <- EMPTY |
| 01001 | -2 | 00000 | R0 <- EMPTY, R1 <- EMPTY |
| 01110 | +1 | 10011 | R3 <- TOS |
| 01110 | -1 | 01001 | R2 <- EMPTY |
| 01110 | -2 | 00100 | R1 <- EMPTY, R2 <- EMPTY |
| 01110 | -3 | 00000 | R0 <- EMPTY, R1 <- EMPTY, R2 <- EMPTY |
| 10011 | -1 | 01110 | R3 <- EMPTY |
| 10011 | -2 | 01001 | R2 <- EMPTY, R3 <- EMPTY |
| 10011 | -3 | 00100 | R1 <- EMPTY, R2 <- EMPTY, R3 <- EMPTY |
| 10011 | -4 | 00000 | R0 <- EMPTY, R1 <- EMPTY, R2 <- EMPTY, R3 <- EMPTY |
| 10000 | -1 | 01111 | R0 <- EMPTY |
| 10000 | -2 | 01010 | R0 <- EMPTY, R3 <- EMPTY |
| 10000 | -3 | 00101 | R0 <- EMPTY, R2 <- EMPTY, R3 <- EMPTY |
| 10000 | -4 | 00000 | R0 <- EMPTY, R1 <- EMPTY, R2 <- EMPTY, R3 <- EMPTY |
| 10001 | -1 | 01100 | R1 <- EMPTY |
| 10001 | -2 | 01011 | R0 <- EMPTY, R1 <- EMPTY |
| 10001 | -3 | 00110 | R0 <- EMPTY, R1 <- EMPTY, R3 <- EMPTY |
| 10001 | -4 | 00000 | R0 <- EMPTY, R1 <- EMPTY, R2 <- EMPTY, R3 <- EMPTY |
| 10010 | -1 | 01101 | R2 <- EMPTY |
| 10010 | -2 | 01000 | R1 <- EMPTY, R2 <- EMPTY |
| 10010 | -3 | 00111 | R0 <- EMPTY, R1 <- EMPTY, R2 <- EMPTY |
| 10010 | -4 | 00000 | R0 <- EMPTY, R1 <- EMPTY, R2 <- EMPTY, R3 <- EMPTY |
| 01111 | +1 | 10000 | R0 <- TOS |
| 01111 | -1 | 01010 | R3 <- EMPTY |
| 01111 | -2 | 00101 | R2 <- EMPTY, R3 <- EMPTY |
| 01111 | -3 | 00000 | R1 <- EMPTY, R2 <- EMPTY, R3 <- EMPTY |
| 01100 | +1 | 10001 | R1 <- TOS |
| 01100 | -1 | 01011 | R0 <- EMPTY |
| 01100 | -2 | 00110 | R0 <- EMPTY, R3 <- EMPTY |
| 01100 | -3 | 00000 | R0 <- EMPTY, R2 <- EMPTY, R3 <- EMPTY |
| 01101 | +1 | 10010 | R2 <- TOS |
| 01101 | -1 | 01000 | R1 <- EMPTY |
| 01101 | -2 | 00111 | R0 <- EMPTY, R1 <- EMPTY |
| 01101 | -3 | 00000 | R0 <- EMPTY, R1 <- EMPTY, R3 <- EMPTY |
| 01010 | +1 | 01111 | R3 <- TOS |
| 01010 | +2 | 10000 | R3 <- TOS-1, R0 <- TOS |
| 01010 | -1 | 00101 | R2 <- EMPTY |
| 01010 | -2 | 00000 | R1 <- EMPTY, R2 <- EMPTY |
| 01011 | +1 | 01100 | R0 <- TOS |
| 01011 | +2 | 10001 | R0 <- TOS-1, R1 <- TOS |
| 01011 | -1 | 00110 | R3 <- EMPTY |
| 01011 | -2 | 00000 | R2 <- EMPTY, R3 <- EMPTY |
| 01000 | +1 | 01101 | R1 <- TOS |
| 01000 | +2 | 10010 | R1 <- TOS-1, R2 <- TOS |
| 01000 | -1 | 00111 | R0 <- EMPTY |
| 01000 | -2 | 00000 | R0 <- EMPTY, R3 <- EMPTY |
| 00110 | +1 | 01011 | R3 <- TOS |
| 00110 | +2 | 01100 | R0 <- TOS, R3 <- TOS-1 |
| 00110 | +3 | 10001 | R1 <- TOS, R0 <- TOS-1, R3 <- TOS-2 |
| 00110 | -1 | 00000 | R2 <- EMPTY |
| 00111 | +1 | 01000 | R0 <- TOS |
| 00111 | +2 | 01101 | R0 <- TOS-1, R1 <- TOS |
| 00111 | +3 | 10010 | R0 <- TOS-2, R1 <- TOS-1, R2 <- TOS |
| 00111 | -1 | 00000 | R3 <- EMPTY |
| 00101 | +1 | 01010 | R2 <- TOS |
| 00101 | +2 | 01111 | R2 <- TOS-1, R3 <- TOS |

TABLE 4-continued

| INITIAL STATE | STACK ACTION | FINAL STATE | ACTIONS |
|---|---|---|---|
| 00101 | +3 | 10000 | R2 <- TOS-2, R3 <- TOS-1, R1 <- TOS |
| 00101 | −1 | 00000 | R1 <- EMPTY |

It will be appreciated that the relationships between states and conditions illustrated in Table 2, Table 3 and Table 4 could be combined into a single state transition table or state diagram, but they have been shown separately above to aid clarity.

The relationships between the different states, conditions, and nett actions may be used to define a hardware state machine (in the form of a finite state machine) for controlling this aspect of the operation of the instruction translator 108. Alternatively, these relationships could be modelled by software or a combination of hardware and software.

There follows below an example of a subset of the possible Java bytecodes that indicates for each Java bytecode of the subset the associated require full, require empty and stack action values for that bytecode which may be used in conjunction with Tables 2, 3 and 4.

---

--- iconst_0

| Operation: | Push int constant |
|---|---|
| Stack: | . . . => |
| | . . . , 0 |
| | Require-Full = 0 |
| | Require-Empty = 1 |
| | Stack-Action = +1 |

--- iadd

| Operation: | Add int |
|---|---|
| Stack: | . . . , value1, value2 = > |
| | . . . , result |
| | Require-Full = 2 |
| | Require-Empty = 0 |
| | Stack-Action = −1 |

--- lload_0

| Operation: | Load long from local variable |
|---|---|
| Stack: | . . . => |
| | . . . , value.word1, value.word2 |
| | Require-Full = 0 |
| | Require-Empty = 2 |
| | Stack-Action = +2 |

--- lastore

| Operation: | Store into long array |
|---|---|
| Stack: | . . . , arrayref, index, value.word1, value.word2 => |
| | . . . |
| | Require-Full = 4 |
| | Require-Empty = 0 |
| | Stack-Action = −4 |

--- land

| Operation | Boolean AND long |
|---|---|
| Stack: | . . . , value1.word1, value1.word2, value2.word1, value2.word2 => |
| | . . . , result.word1, result.word2 |
| | Require-Full = 4 |
| | Require-Empty = 0 |
| | Stack-Action = −2 |

--- iastore

| Operation: | Store into int array |
|---|---|
| Stack: | . . . , arrayref, index, value = > |
| | . . . |
| | Require-Full = 3 |

-continued

| | Require-Empty = 0 |
|---|---|
| | Stack-Action = −3 |

--- ineg

| Operation: | Negate int |
|---|---|
| Stack: | . . . , value => |
| | . . . , result |
| | Require-Full = 1 |
| | Require-Empty = 0 |
| | Stack-Action = 0 |

There also follows example instruction templates for each of the Java bytecode instructions set out above. The instructions shown are the ARM instructions which implement the required behaviour of each of the Java bytecodes. The register field "TOS−3", "TOS−2", "TOS−1", "TOS", "TOS+1" and "TOS+2" may be replaced with the appropriate register specifier as read from Table 1 depending upon the mapping state currently adopted. The denotation "TOS+n" indicates the Nth register above the register currently storing the top of stack operand starting from the register storing the top of stack operand and counting upwards in register value until reaching the end of the set of registers at which point a wrap is made to the first register within the set of registers.

| iconst_0 | MOV | tos + 1, #0 |
|---|---|---|
| lload_0 | LDR | tos + 2, [vars, #4] |
| | LDR | tos + 1, [vars, #0] |
| iastore | LDR | Rtmp2, [tos-2, #4] |
| | LDR | Rtmp1, [tos-2, #0] |
| | CMP | tos-1, Rtmp2, LSR #5 |
| | BLXCS | Rexc |
| | STR | tos, [Rtmp1, tos-1, LSL #2] |
| lastore | LDR | Rtmp2, [tos-3, #4] |
| | LDR | Rtmp1, [tos-3, #0] |
| | CMP | tos-2, Rtmp2, LSR #5 |
| | BLXCS | Rexc |
| | STR | tos-1, [Rtmp1, tos-2, LSL #3]! |
| | STR | tos, [Rtmp1, #4] |
| iadd | ADD | tos-1, tos-1, tos |
| ineg | RSB | tos, tos, #0 |
| land | AND | tos-2, tos-2, tos |
| | AND | tos-3, tos-3, tos-1 |

An example execution sequence is illustrated below of a single Java bytecode executed by a hardware translation unit 108 in accordance with the techniques described above. The execution sequence is shown in terms of an initial state progressing through a sequence of states dependent upon the instructions being executed, generating a sequence of ARM instructions as a result of the actions being performed on each state transition, the whole having the effect of translating a Java bytecode to a sequence of ARM instructions.

| | |
|---|---|
| Initial state: | 00000 |
| Instruction: | iadd (Require-Full = 2, Require-Empty = 0, Stack-Action = −1) |
| Condition: | Require-Full > 0 |
| State Transition: | 00000 >0 00100 |
| ARM Instruction(s): | LDR R0, [Rstack, #−4]! |
| Next state: | 00100 |
| Instruction: | iadd (Require-Full = 2, Require-Empty = 0, Stack-Action = −1) |
| Condition: | Require-Full > 1 |
| State Transition: | 00100 >1 01000 |
| ARM Instructions(s): | LDR R3, [Rstack, #−4]! |
| Next state: | 01000 |
| Instruction: | iadd (Require-Full = 2, Require-Empty = 0, Stack-Action = −1) |
| Condition: | Stack-Action = −1 |
| State Transition: | 01000 −1 00111 |
| Instruction template: | ADD tos-1, tos-1, tos |
| ARM Instructions(s) | (after substitution): ADD R3, R3, R0 |
| Next state: | 00111 |

FIG. 6 illustrates in a different way the execution of a number of further Java bytecode instructions. The top portion of FIG. 6 illustrates the sequence of ARM instructions and changes of mapping states and register contents that occur upon execution of an iadd Java bytecode instruction. The initial mapping state is 00000 corresponding to all of the registers within the set of registers being empty. The first two ARM instructions generated serve to POP two stack operands into the registers storing stack operands with the top of stack "TOS" register being R0. The third ARM instruction actually performs the add operation and writes the result into register R3 (which now becomes the top of stack operand) whilst consuming the stack operand that was previously held within register R1, thus producing an overall stack action of −1.

Processing then proceeds to execution of two Java bytecodes each representing a long load of two stack operands. The require empty condition of 2 for the first Java bytecode is immediately met and accordingly two ARM LDR instructions may be issued and executed. The mapping state after execution of the first long load Java bytecode is 01101. In this state the set of registers contains only a single empty register. The next Java bytecode long load instruction has a require empty value of 2 that is not met and accordingly the first action required is a PUSH of a stack operand to the addressable memory using an ARM STR instruction. This frees up a register within the set of registers for use by a new stack operand which may then be loaded as part of the two following LDR instructions. As previously mentioned, the instruction translation may be achieved by hardware, software, or a combination of the two. Given below is a subsection of an example software interpreter generated in accordance with the above described techniques.

| | | | |
|---|---|---|---|
| Interpret | LDRB | Rtmp, [Rjpc, #1]! | |
| | LDR | pc, [pc, Rtmp, lsl #2] | |
| | DCD | 0 | |
| | . . . | | |
| | DCD | do_iconst_0; | Opcode 0 × 03 |
| | . . . | | |
| | DCD | do_lload_0; | Opcode 0 × 1e |
| | . . . | | |
| | DCD | do_iastore; | Opcode 0 × 4f |
| | DCD | do_lastore; | Opcode 0 × 50 |
| | . . . | | |
| | DCD | do_iadd; | Opcode 0 × 60 |
| | . . . | | |
| | DCD | do_ineg; | Opcode 0 × 74 |
| | . . . | | |
| | DCD | do_land; | Opcode 0 × 7f |
| | . . . | | |
| do_iconst_0 | MOV | R0, #0 | |
| | STR | R0, [Rstack], #4 | |
| | B | Interpret | |
| do_lload_0 | LDMIA | Rvars, {R0, R1} | |
| | STMIA | Rstack!, {R0, R1} | |
| | B | Interpret | |
| do_iastore | LDMDB | Rstack!, {R0, R1, R2} | |
| | LDR | Rtmp2, [r0, #4] | |
| | LDR | Rtmp1, [r0, #0] | |
| | CMP | R1, Rtmp2, LSR #5 | |
| | BCS | ArrayBoundException | |
| | STR | R2, [Rtmp1, R1, LSL #2] | |
| | B | Interpret | |
| do_lastore | LDMDB | Rstack!, {R0, R1, R2, R3} | |
| | LDR | Rtmp2, [r0, #4] | |
| | LDR | Rtmp1, [r0, #0] | |
| | CMP | R1, Rtmp2, LSR #5 | |
| | BCS | ArrayBoundException | |
| | STR | R2, [Rtmp1, R1, LSL #3]! | |
| | STR | R3, [Rtmp1, #4] | |
| | B | Interpret | |
| do_iadd | LDMDB | Rstack!, {r0, r1} | |
| | ADD | r0, r0, r1 | |

|  |  |  |  |
|---|---|---|---|
|  | STR | r0, [Rstack], #4 |  |
|  | B | Interpret |  |
| do_ineg | LDR | r0, [Rstack, #-4]! |  |
|  | RSB | tos, tos, #0 |  |
|  | STR | r0, [Rstack], #4 |  |
|  | B | Interpret |  |
| do_land | LDMDB | Rstack!, {r0, r1, r2, r3} |  |
|  | AND | r1, r1, r3 |  |
|  | AND | r0, r0, r2 |  |
|  | STMIA | Rstack!, {r0, r1} |  |
|  | B | Interpret |  |
| State_00000_Interpret | LDRB | Rtmp, [Rjpc, #1]! |  |
|  | LDR | pc, [pc, Rtmp, lsl #2] |  |
|  | DCD | 0 |  |
|  | . . . |  |  |
|  | DCD | State_00000_do_iconst_0; | Opcode 0 × 03 |
|  | . . . |  |  |
|  | DCD | State_00000_do_lload_0; | Opcode 0 × 1e |
|  | . . . |  |  |
|  | DCD | State_00000_do_iastore; | Opcode 0 × 4f |
|  | DCD | State_00000_do_lastore; | Opcode 0 × 50 |
|  | . . . |  |  |
|  | DCD | State_00000_do_iadd; | Opcode 0 × 60 |
|  | . . . |  |  |
|  | DCD | State_00000_do_ineg; | Opcode 0 × 74 |
|  | . . . |  |  |
|  | DCD | State_00000_do_land; | Opcode 0 × 7f |
|  | . . . |  |  |
| State_00000_do_iconst_0 | MOV | R1, #0 |  |
|  | B | State_00101_Interpret |  |
| State_00000_do_lload_0 | LDMIA | Rvars, {R1, R2} |  |
|  | B | State_01010_Interpret |  |
| State_00000_do_iastore | LDMDB | Rstack!, {R0, R1, R2} |  |
|  | LDR | Rtmp2, [r0, #4] |  |
|  | LDR | Rtmp1, [r0, #0] |  |
|  | CMP | R1, Rtmp2, LSR #5 |  |
|  | BCS | ArrayBoundException |  |
|  | STR | R2, [Rtmp1, R1, LSL #2] |  |
|  | B | State_00000_Interpret |  |
| State_00000_do_lastore | LDMDB | Rstack!, {R0, R1, R2, R3} |  |
|  | LDR | Rtmp2, [r0, #4] |  |
|  | LDR | Rtmp1, [r0, #0] |  |
|  | CMP | R1, Rtmp2, LSR #5 |  |
|  | BCS | ArrayBoundException |  |
|  | STR | R2, [Rtmp1, R1, LSL #3]! |  |
|  | STR | R3, [Rtmp1, #4] |  |
|  | B | State_00000_Interpret |  |
| State_00000_do_iadd | LDMDB | Rstack!, {R1, R2} |  |
|  | ADD | r1, r1, r2 |  |
|  | B | State_00101_Interpret |  |
| State_00000_do_ineg | LDR | r1, [Rstack, #-4]! |  |
|  | RSB | r1, r1, #0 |  |
|  | B | State_00101_Interpret |  |
| State_00000_do_land | LDR | r0, [Rstack, #-4]! |  |
|  | LDMDB | Rstack!, {r1, r2, r3} |  |
|  | AND | r2, r2, r0 |  |
|  | AND | r1, r1, r3 |  |
|  | B | State_01010_Interpret |  |
| State_00100_Interpret | LDRB | Rtmp, [Rjpc, #1]! |  |
|  | LDR | pc, [pc, Rtmp, lsl #2] |  |
|  | DCD | 0 |  |
|  | . . . |  |  |
|  | DCD | State_00100_do_iconst_0; | Opcode 0 × 03 |
|  | . . . |  |  |
|  | DCD | State_00100_do_lload_0; | Opcode 0 × 1e |
|  | . . . |  |  |
|  | DCD | State_00100_do_iastore; | Opcode 0 × 4f |
|  | DCD | State_00100_do_lastore; | Opcode 0 × 50 |
|  | . . . |  |  |
|  | DCD | State_00100_do_iadd; | Opcode 0 × 60 |
|  | . . . |  |  |
|  | DCD | State_00100_do_ineg; | Opcode 0 × 74 |
|  | . . . |  |  |
|  | DCD | State_00100_do_land; | Opcode 0 × 7f |
|  | . . . |  |  |
| State_00100_do_iconst_0 | MOV | R1, #0 |  |
|  | B | State_01001_Interpret |  |
| State_00100_do_lload_0 | LDMIA | Rvars, {r1, R2} |  |
|  | B | State_01110_Interpret |  |

-continued

| | | |
|---|---|---|
| State__00100__do__iastore | LDMDB | Rstack!, {r2, r3} |
| | LDR | Rtmp2, [r2, #4] |
| | LDR | Rtmp1, [r2, #0] |
| | CMP | R3, Rtmp2, LSR #5 |
| | BCS | ArrayBoundException |
| | STR | R0, [Rtmp1, R3, lsl #2] |
| | B | State__00000__Interpret |
| State__00100__do__lastore | LDMDB | Rstack!, {r1, r2, r3} |
| | LDR | Rtmp2, [r1, #4] |
| | LDR | Rtmp1, [r1, #0] |
| | CMP | r2, Rtmp2, LSR #5 |
| | BCS | ArrayBoundException |
| | STR | r3, [Rtmp1, r2, lsl #3]! |
| | STR | r0, [Rtmp1, #4] |
| | B | State__00000__Interpret |
| State__00100__do__iadd | LDR | r3, [Rstack, #-4]! |
| | ADD | r3, r3, r0 |
| | B | State__00111__Interpret |
| State__00100__do__ineg | RSB | r0, r0, #0 |
| | B | State__00100__Interpret |
| State__00100__do__land | LDMDB | Rstack!, {r1, r2, r3} |
| | AND | r2, r2, r0 |
| | AND | r1, r1, r3 |
| | B | State__01010__Interpret |
| State__01000__Interpret | LDRB | Rtmp, [Rjpc, #1]! |
| | LDR | pc, [pc, Rtmp, lsl #2] |
| | DCD | 0 |
| | . . . | |
| | DCD | State__01000__do__iconst__0; Opcode 0 × 03 |
| | . . . | |
| | DCD | State__01000__do__lload__0; Opcode 0 × 1e |
| | . . . | |
| | DCD | State__01000__do__iastore; Opcode 0 × 4f |
| | DCD | State__01000__do__lastore; Opcode 0 × 50 |
| | . . . | |
| | DCD | State__01000__do__iadd; Opcode 0 × 60 |
| | . . . | |
| | DCD | State__01000__do__ineg; Opcode 0 × 74 |
| | . . . | |
| | DCD | State__01000__do__land; Opcode 0 × 7f |
| | . . . | |
| State__01000__do__iconst__0 | MOV | R1, #0 |
| | B | State__01101__Interpret |
| State__01000__do__lload__0 | LDMIA | Rvars, {r1, r2} |
| | B | State__10010__Interpret |
| State__01000__do__iastore | LDR | r1, [Rstack, #-4]! |
| | LDR | Rtmp2, [R3, #4] |
| | LDR | Rtmp1, [R3, #0] |
| | CMP | r0, Rtmp2, LSR #5 |
| | BCS | ArrayBoundException |
| | STR | r1, [Rtmp1, r0, lsl #2] |
| | B | State__00000__Interpret |
| State 01000__do__lastore | LDMDB | Rstack!, {r1, r2} |
| | LDR | Rtmp2, {r3, #4} |
| | LDR | Rtmp1, {R3, #0} |
| | CMP | r0, Rtmp2, LSR #5 |
| | BCS | ArrayBoundException |
| | STR | r1, [Rtmp1, r0, lsl #3]! |
| | STR | r2, [Rtmp1, #4] |
| | B | State__00000__Interpret |
| State__01000__do__iadd | ADD | r3, r3, r0 |
| | B | State__00111__Interpret |
| State__01000__do__ineg | RSB | r0, r0, #0 |
| | B | State__01000__Interpret |
| State__01000__do__land | LDMDB | Rstack!, {r1, r2} |
| | AND | R0, R0, R2 |
| | AND | R3, R3, R1 |
| | B | State__01000__Interpret |
| State__01100__Interpret | . . . | |
| State__10000__Interpret | . . . | |
| State__00101__Interpret | . . . | |
| State__01001__Interpret | . . . | |
| State__01101__Interpret | . . . | |
| State__10001__Interpret | . . . | |
| State__00110__Interpret | . . . | |
| State__01010__Interpret | . . . | |
| State__01110__Interpret | . . . | |
| State__10010__Interpret | . . . | |
| State__00111__Interpret | . . . | |

| | |
|---|---|
| State_01011_Interpret | ... |
| State_01111_Interpret | ... |
| State_10011_Interpret | ... |

Figure 7:
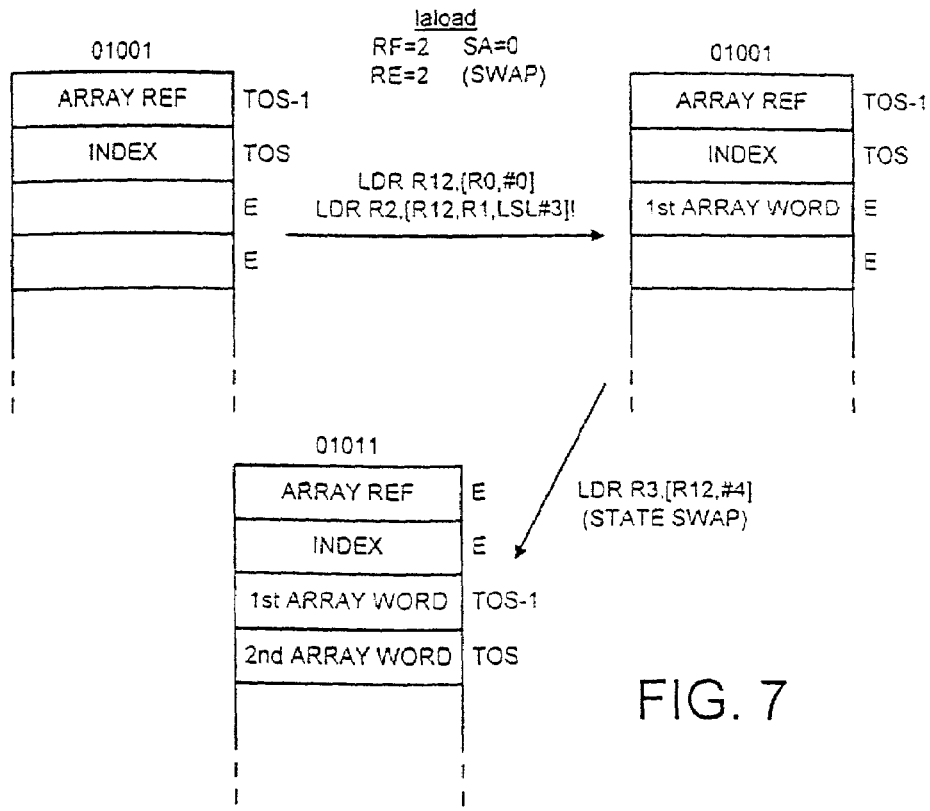
FIG. 7 schematically illustrates the execution of a non-native instruction as a sequence of native instructions.

FIG. 7 illustrates a Java bytecode instruction "laload" which has the function of reading two words of data from within a data array specified by two words of data starting at the top of stack position. The two words read from the data array then replace the two words that specified their position and to form the topmost stack entries.

In order that the "laload" instruction has sufficient register space for the temporary storage of the stack operands being fetched from the array without overwriting the input stack operands that specify the array and position within the array of the data, the Java bytecode instruction is specified as having a require empty value of 2, i.e. two of the registers within the register bank dedicated to stack operand storage must be emptied prior to executing the ARM instructions emulating the "laload" instruction. If there are not two empty resisters when this Java bytecode is encountered, then store operations (STRs) may be performed to PUSH stack operands currently held within the registers out to memory so as to make space for the temporary storage necessary and meet the require empty value for the instruction.

The instruction also has a require full value of 2 as the position of the data is specified by an array location and an index within that array as two separate stack operands. The drawing illustrates the first state as already meeting the require full and require empty conditions and having a mapping state of "01001". The "laload" instruction is broken down into three ARM instructions. The first of these loads the array reference into a spare working register outside of the set of registers acting as a register cache of stack operands. The second instruction then uses this array reference in conjunction with an index value within the array to access a first array word that is written into one of the empty registers dedicated to stack operand storage.

It is significant to note that after the execution of the first two ARM instructions, the mapping state of the system is not changed and the top of stack pointer remains where it started with the registers specified as empty still being so specified.

The final instruction within the sequence of ARM instructions loads the second array word into the set of registers for storing stack operands. As this is the final instruction, if an interrupt does occur during it, then it will not be serviced until after the instruction completes and so it is safe to change the input state with this instruction by a change to the mapping state of the registers storing stack operands. In this example, the mapping state chances to "01011" which places the new top of stack pointer at the second array word and indicates that the input variables of the array reference and index value are now empty registers, i.e. marking the registers as empty is equivalent to removing the values they held from the stack.

It will be noted that whilst the overall stack action of the "laload" instruction has not changed the number of stack operands held within the registers, a mapping state swap has nevertheless occurred. The change of mapping state performed upon execution of the final operation is hardwired into the instruction translator as a function of the Java bytecode being translated and is indicated by the "swap" parameter shown as a characteristic of the "laload" instruction.

Whilst the example of this drawing is one specific instruction, it will be appreciated that the principles set out may be extended to many different Java bytecode instructions that are emulated as ARM instructions or other types of instruction.

Figure 8:
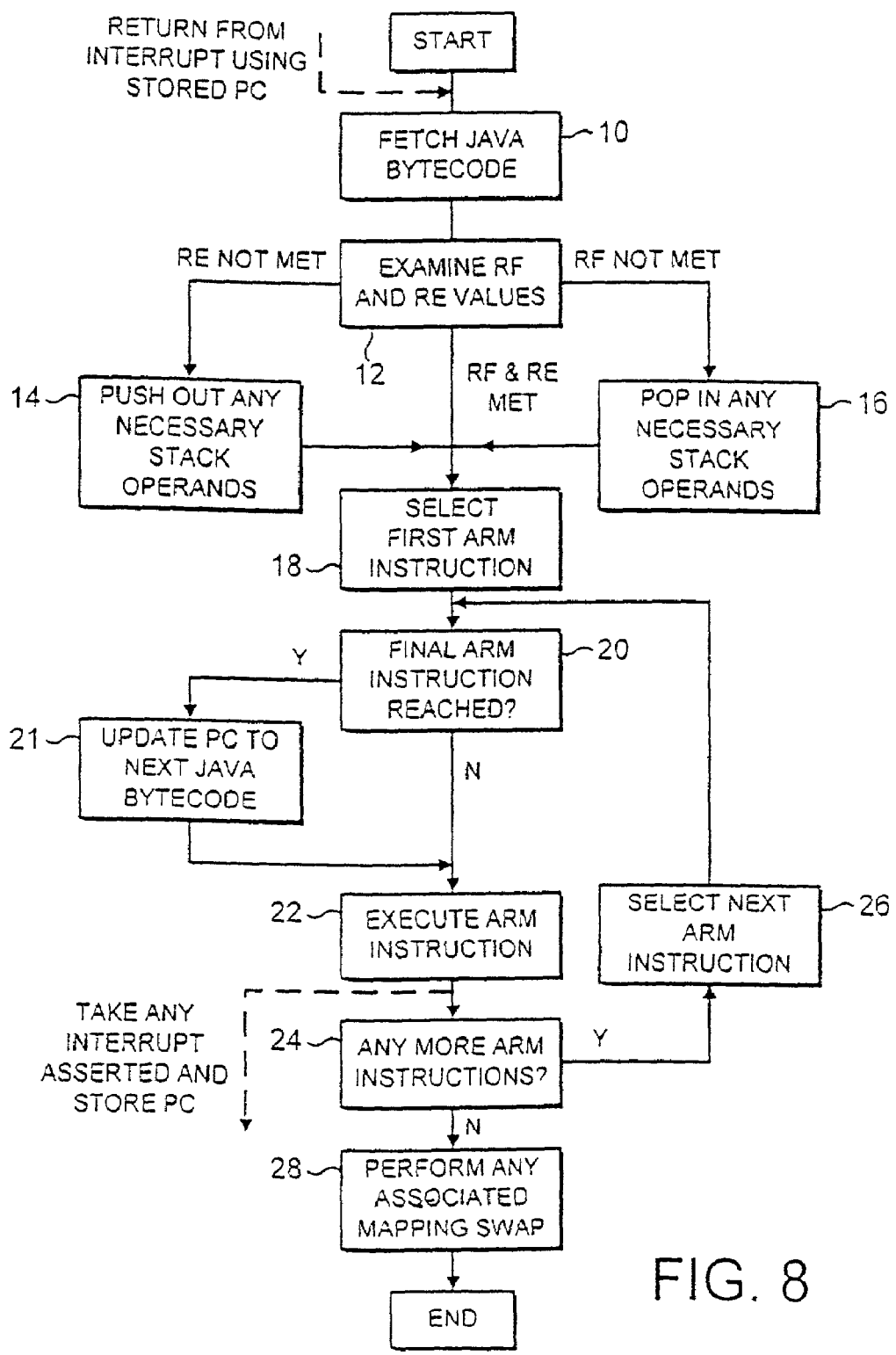
FIG. 8 is a flow diagram illustrating the way in which the instruction translator may operate in a manner that preserves interrupt latency for translated instructions;.

FIG. 8 is a flow diagram schematically illustrating the above technique. At step 10 a Java bytecode is fetched from memory. At step 12 the require full and require empty values for that Java bytecode are examined. If either of the require empty or require full conditions are not met, then respective PUSH and POP operations of stack operands (possibly multiple stack operands) may be performed with steps 14 and 16. It is will be noted that this particular system does not allow the require empty and require full conditions to be simultaneously unmet. Multiple passes through steps 14 and 16 may be required until the condition of step 12 is met.

At step 18, the first ARM instruction specified within the translation template for the Java bytecode concerned is selected. At step 20, a check is made as to whether or not the selected ARM instruction is the final instruction to be executed in the emulation of the Java bytecode fetched at step 10. If the ARM instruction being executed is the final instruction, then step 21 serves to update the program counter value to point to the next Java bytecode in the sequence of instructions to be executed. It will be understood that if the ARM instruction is the final instruction, then it will complete its execution irrespective of whether or not an interrupt now occurs and accordingly it is safe to update the program counter value to the next Java bytecode and restart execution from that point as the state of the system will have reached that matching normal, uninterrupted, full execution of the Java bytecode. If the test at step 20 indicates that the final bytecode has not been reached, then updating of the program counter value is bypassed.

Step 22 executes the current ARM instruction. At step 24 a test is made as to whether or not there are any more ARM instructions that require executing as part of the template. If there are more ARM instructions, then the next of these is selected at step 26 and processing is returned to step 20. If there are no more instructions, then processing proceeds to step 28 at which any mapping change/swap specified for the Java bytecode concerned is performed in order to reflect the desired top of stack location and full/empty status of the various registers holding stack operands.

FIG. 8 also schematically illustrates the points at which an interrupt if asserted is serviced and then processing restarted after an interrupt. An interrupt starts to be serviced after the execution of an ARM instruction currently in progress at step 22 with whatever is the current program counter value being stored as a return point with the bytecode sequence. If the current ARM instruction executing is the final instruction within the template sequence, then step 21 will have just updated the program counter value and accordingly this will point to the next Java bytecode (or ARM instruction should an instruction set switch have just been initiated). If the currently executing ARM instruction is anything other than the final instruction in the sequence, then the program counter value will still be the same as that indicated at the start of the execution of the Java bytecode concerned and accordingly when a return is made, the whole Java bytecode will be re-executed.

Figure 9:
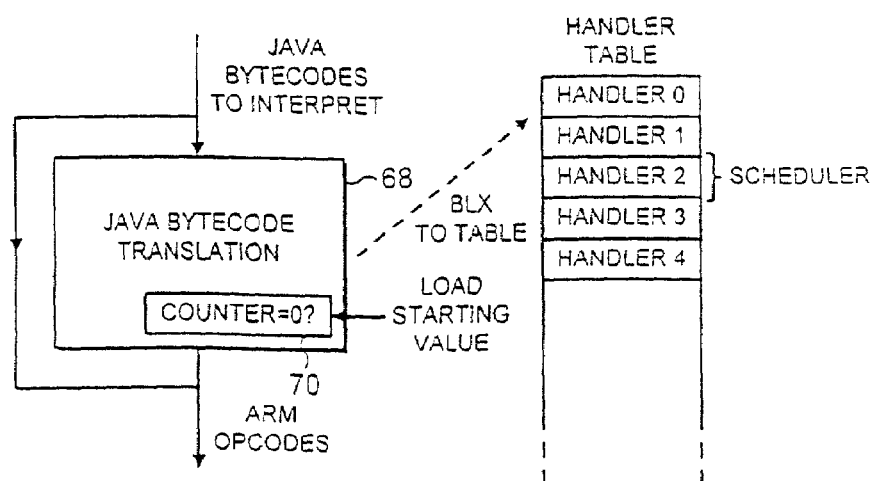
FIG. 9 schematically illustrates the translation of Java bytecodes into ARM opcodes using hardware and software techniques.

FIG. 9 illustrates a Java bytecode translation unit 68 that receives a stream of Java bytecodes and outputs a translated stream of ARM instructions (or corresponding control signals) to control the action of a processor core. As described previously, the Java bytecode translator 68 translates simple Java bytecodes using instruction templates into ARM instructions or sequences of ARM instructions. When each Java bytecode has been executed, then a counter value within scheduling control logic 70 is decremented. When this counter value reaches 0, then the Java bytecode translation unit 68 issues an ARM instruction branching to scheduling code that manages scheduling between threads or tasks as appropriate.

Whilst simple Java bytecodes are handled by the Java bytecode translation unit 68 itself providing high speed hardware based execution of these bytecodes, bytecodes requiring more complex processing operations are sent to a software interpreter provided in the form of a collection of interpretation routines (examples of a selection of such routines are given earlier in this description). More specifically, the Java bytecode translation unit 68 can determined that the bytecode it has received is not one which is supported by hardware translation and accordingly a branch can be made to an address dependent upon that Java bytecode where a software routine for interpreting that bytecode is found or referenced. This mechanism can also be employed when the scheduling logic 70 indicates that a scheduling operation is needed to yield a branch to the scheduling code.

Figure 10:
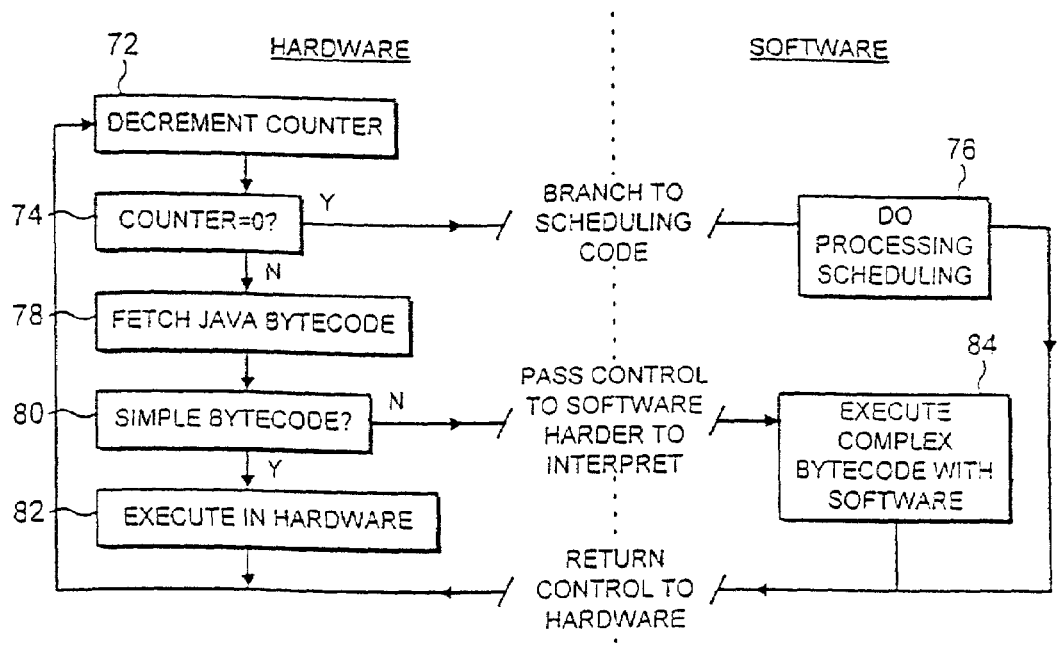
FIG. 10 schematically illustrates the flow of control between a hardware based translator, a software based interpreter and software based scheduling.

FIG. 10 illustrates the operation of the embodiment of FIG. 9 in more detail and the split of tasks between hardware and software. All Java bytecodes are received by the Java bytecode translation unit 68 and cause the counter to be decremented at step 72. At step 74 a check is made as to whether or not the counter value has reached 0. If the counter value has reached 0 (counting down from either a predetermined value hardwired into the system or a value that may be user controlled/programmed), then a branch is made to scheduling code at step 76. Once the scheduling code has completed at step 76, control is returned to the hardware and processing proceeds to step 72, where the next Java bytecode is fetched and the counter again decremented. Since the counter reached 0, then it will now roll round to a new, non-zero value. Alternatively, a new value may be forced into the counter as part of the exiting of the scheduling process at step 76.

If the test at step 74 indicated that the counter did not equal 0, then step 78 fetches the Java bytecode. At step 80 a determination is made as to whether the fetched bytecode is a simple bytecode that may be executed by hardware translation at step 82 or requires more complex processing and accordingly should be passed out for software interpretation at step 84. If processing is passed out to software interpretation, then once this has completed control is returned to the hardware where step 72 decrements the counter again to take account of the fetching of the next Java bytecode.

Figure 11:
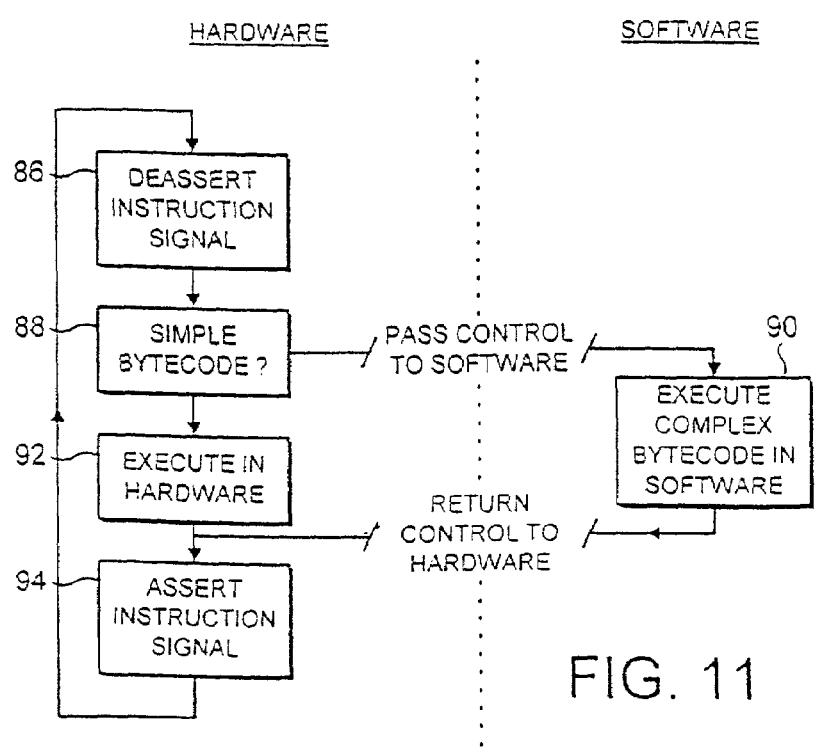
FIGS. 11 and 12 illustrate another way of controlling scheduling operations using a timer based approach.

FIG. 11 illustrates an alternative control arrangement. At the start of processing at step 86 an instruction signal (scheduling signal) is deasserted. At step 88, a fetched Java bytecode is examined to see if it is a simple bytecode for which hardware translation is supported. If hardware translation is not supported, then control is passed out to the interpreting software at step 90 which then executes a ARM instruction routine to interpret the Java bytecode. If the bytecode is a simple one for which hardware translation is supported, then processing proceeds to step 92 at which one or more ARM instructions are issued in sequence by the Java bytecode translation unit 68 acting as a form of multi-cycle finite state machine. Once the Java bytecode has been properly executed either at step 90 or at step 92, then processing proceeds to step 94 at which the instruction signal is asserted for a short period prior to being deasserted at step 86. The assertion of the instruction signal indicates to external circuitry that an appropriate safe point has been reached at which a timer based scheduling interrupt could take place without risking a loss of data integrity due to the partial execution of an interpreted or translated instruction.

Figure 12:
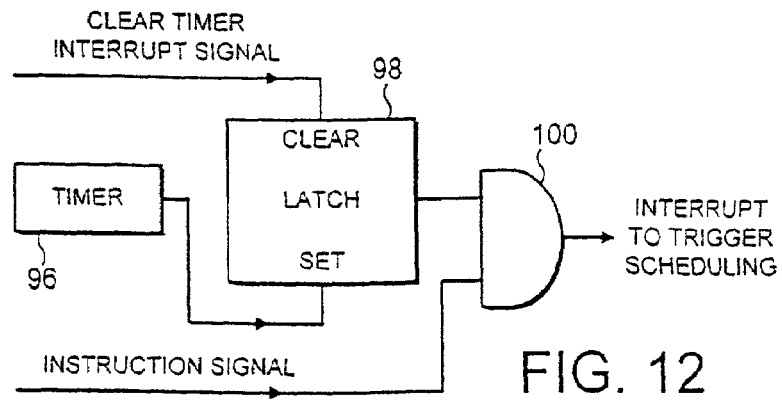

FIG. 12 illustrates example circuitry that may be used to respond to the instruction signal generated in FIG. 11. A timer 96 periodically generates a timer signal after expiry of a given time period. This timer signal is stored within a latch 98 until it is cleared by a clear timer interrupt signal. The output of the latch 98 is logically combined by an AND gate 100 with the instruction signal asserted at step 94. When the latch is set and the instruction signal is asserted, then an interrupt is generated as the output of the AND gate 100 and is used to trigger an interrupt that performs scheduling operations using the interrupt processing mechanisms provided within the system for standard interrupt processing. Once the interrupt signal has been generated, this in turn triggers the production of a clear timer interrupt signal that clears the latch 98 until the next timer output pulse occurs.

Figure 13:
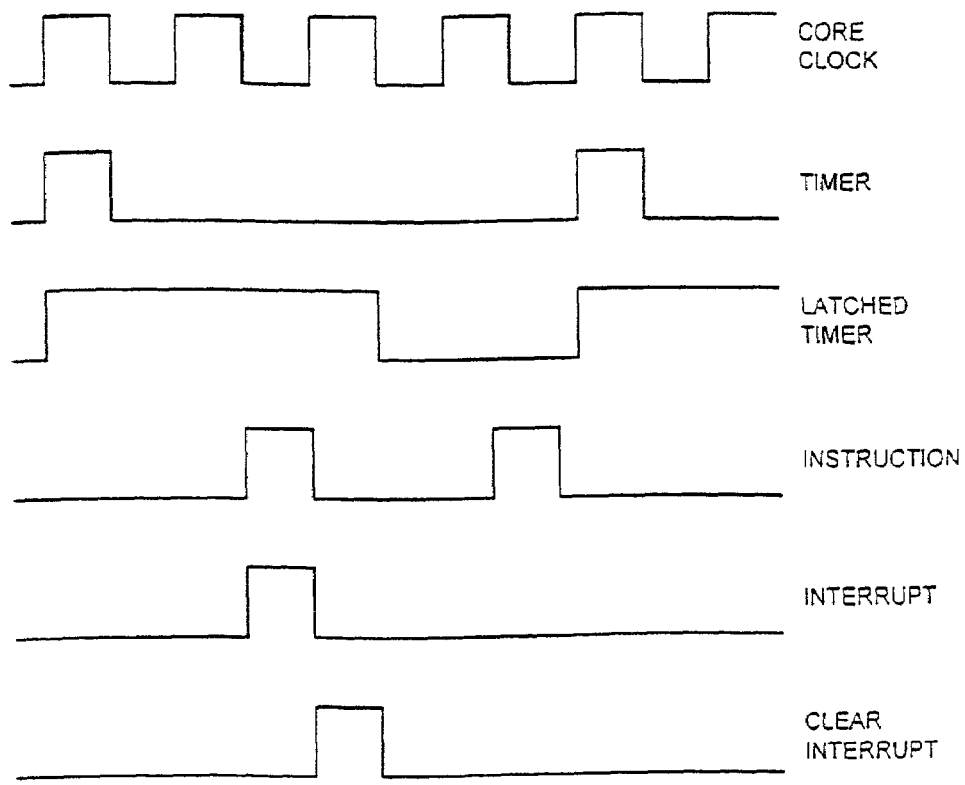
FIG. 13 is a signal diagram illustrating the signals controlling the operation of the circuit of FIG. 12.

FIG. 13 is a signal diagram illustrating the operation of the circuit of FIG. 12. The processor core clock signals occur at a regular frequency. The timer 96 generates timer signals at predetermined periods to indicate that, when safe, a scheduling operation should be initiated. The timer signals are latched. Instruction signals are generated at times spaced apart by intervals that depend upon how quickly a particular Java bytecode was executed. A simple Java bytecode may execute in a single processor core clock cycle, or more typically two or three, whereas a complex Java bytecode providing a high level management type function may take several hundred processor clock cycles before its execution is completed by the software interpreter. In either case, a pending asserted latched timer signal is not acted upon to trigger a scheduling operation until the instruction signal issues indicating that it is safe for the scheduling operation to commence. The simultaneous occurrence of a latched timer signal and the instruction signal triggers the generation of an interrupt signal followed immediately thereafter by a clear signal that clears the latch 98.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus for processing data, said apparatus comprising:

(i) a processor core having a register bank containing a plurality of registers and being operable to execute operations upon register operands held in said registers as specified within instructions of a first instruction set; and (ii) an instruction translator operable to translate instructions of a second instruction set into translator output signals corresponding to instructions of said first instruction set, instructions of said second instruction set specifying operations to be executed upon stack operands held in a stack; wherein (iii) said instruction translator is operable to allocate a set of registers within said register bank to hold stack operands from a portion of said stack;

(iv) said instruction translator has a plurality of mapping states in which different registers within said set of registers hold respective stack operands from different positions within said portion of said stack;

(v) said instruction translator is operable to change between said plurality of mapping states in dependence upon operations that add or remove stack operands held within said set of registers; and (vi) wherein said instruction translator uses a plurality of instruction templates for translating instructions from said second instruction set to instructions from said first instruction set and wherein an instruction from said second instruction set including one or more stack operands has an instruction template comprising one or more instructions from said first instruction set in which register operands are mapped to said stack operands in dependence upon a currently adopted mapping state of said instruction translator.

2. An apparatus as claimed in claim 1, wherein said translator output signals include signals forming an instruction of said first instruction set.

3. An apparatus as claimed in claim 1, wherein said translator output signals include control signals that control operation of said processor core and said control signals match control signals produced on decoding instructions of said first instruction set.

4. An apparatus as claimed in claim 1, wherein said translator output signals include control signals that control operation of said processor core and specify parameters not specified by control signals produced on decoding instructions of said first instruction set.

5. An apparatus as claimed in claim 1, wherein said instruction translator provides mapping states such that stack operands are added to or removed from said set of registers without moving stack operands between registers within said set of registers.

6. An apparatus as claimed in claim 1, wherein said set of registers are operable to hold stack operands from a top portion of said stack including a top of stack operand from a top position within said stack.

7. An apparatus as claimed in claim 1, wherein said stack further comprises a plurality of addressable memory locations holding stack operands.

8. An apparatus as claimed in claim 7, wherein stack operands overflow from said set of registers into said plurality of addressable memory locations.

9. An apparatus as claimed in claim 7, wherein stack operands held within said plurality of addressable memory locations are loaded into said set of registers prior to use.

10. An apparatus as claimed in claim 1, wherein said instruction translator comprises one or more of:

(i) hardware translation logic;

(ii) instruction interpreting program code controlling a computer apparatus;

(iii) instruction compiling program code controlling a computer apparatus; and (iv) hardware compiling logic.

11. An apparatus as claimed in claim 1, wherein said instruction translator includes a first plurality of state bits indicative of a number of stack operands held within said set of registers.

12. An apparatus as claimed in claim 11, wherein said instruction translator includes a second plurality of state bits indicative of which register within said set of registers holds said top of stack operand.

13. An apparatus as claimed in claim 1, wherein said second instruction set is a Java Virtual Machine instruction set.

14. A method of processing data using a processor core having a register bank containing a plurality of registers and being operable to execute operations upon register operands held in said registers as specified within instructions of a first instruction set, said method comprising the steps of:

(i) translating instructions of a second instruction set into translator output signals corresponding to instructions of said first instruction set using a plurality of instruction templates, instructions of said second instruction set specifying operations to be executed upon stack operands held in a stack;

(ii) allocating a set of registers within said register bank to hold stack operands from a portion of said stack;

(iii) adopting one of a plurality of mapping states in which different registers within said set of registers hold respective stack operands from different positions within said portion of said stack wherein an instruction from said second instruction set including at least one stack operand has an instruction template comprising at least one instruction from said first instruction set in which register operands are mapped to said stack operands in dependence upon a currently adopted mapping state of said translating step; and (iv) changing between said plurality of mapping states in dependence upon operations that add or remove stack operands held within said set of registers.

15. A computer readable storage medium including computer readable instructions that when executed perform the method of claim 14.

* * * * *